United States Patent [19]

Blondel et al.

[11] Patent Number: 5,548,640
[45] Date of Patent: Aug. 20, 1996

[54] METHOD FOR UPDATING A SYSTEM PROGRAM IN A SWITCHING EQUIPMENT

[75] Inventors: Erik Blondel, Ruiselede; Frans Verhulst, Destelbergen, both of Belgium; Johann Ulrich, Zeiselmauer, Austria

[73] Assignee: Siemens Aktiengesellschaft, Munich, Germany

[21] Appl. No.: 266,246

[22] Filed: Jun. 27, 1994

[30] Foreign Application Priority Data

Jun. 30, 1993 [DE] Germany ............... 43 217 74.5

[51] Int. Cl.$^6$ .................. H04M 3/00; H04M 1/24; H04M 3/08; H04M 3/22
[52] U.S. Cl. .................. 379/242; 379/10; 379/284
[58] Field of Search ................... 379/9, 10, 11, 379/14, 34, 201, 207, 242, 284

[56] References Cited

U.S. PATENT DOCUMENTS 4,782,506  11/1988  Sevcik ........................ 379/242 X

FOREIGN PATENT DOCUMENTS 0477414  1/1992  European Pat. Off.

OTHER PUBLICATIONS

Telcom Report, "ISDN in the Office-HICOM", Dec. 1985, pp. 3–110.

Primary Examiner—Jeffery Hofsass
Assistant Examiner—Harry S. Hong
Attorney, Agent, or Firm—Hill, Steadman & Simpson

[57] ABSTRACT

A method for updating a system program in a switching equipment. Many known, program-controlled switching equipment have a system program deposited in read-only memories. For modifying the system program, a replacement of the read-only memories is necessary, as known. The method updates the system program without having to undertake interventions in the existing switching equipment. Proceeding from a data processing device, administration and maintenance orders are communicated to the administration and maintenance interface of the existing switching equipment, these administration and maintenance orders being misused for the purpose of transmitting an updated system program stored in the data processing device into the switching equipment and in order to reroute the program processing of the system processor located in the switching equipment onto the newly written system program.

5 Claims, 3 Drawing Sheets

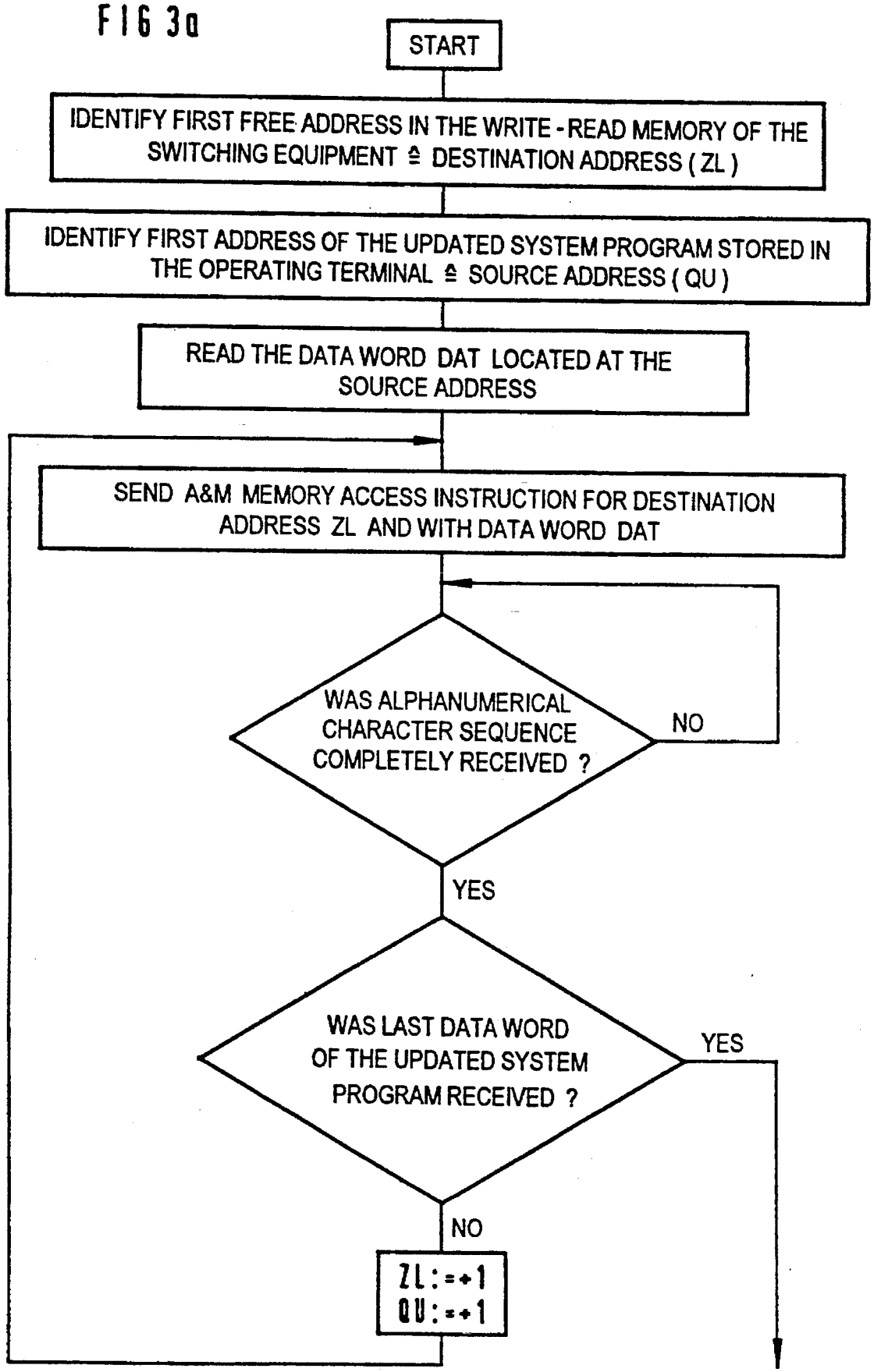

METHOD FOR UPDATING A SYSTEM PROGRAM IN A SWITCHING EQUIPMENT

BACKGROUND OF THE INVENTION

Program-controlled switching equipment serve the purpose of connecting communication terminal equipment to one another and of connecting these terminal equipment to communication networks, particularly public networks. The variety of known switching equipment extends from simple telephone exchange systems for the exclusive transmission of voice up to complex ISDN communication systems having simultaneous multiple communication or even mixed communication of voice, text, image and data. A communication system of this latter type is known from a special issue of "TELCOM Report" — ISDN im Buero, 1985, ISBN 3-8009-3846-4, Siemens AG.

Regardless of their degree of complexity, switching equipment are to be fundamentally understood as being digital data processing systems that have a close functional relationship to a plurality of periphery units related to the switching technique. The program-oriented part, generally referred to as system software, of a switching equipment is usually structured task-oriented or, respectively, function-oriented and is divided into a call processing software component, a dependability software component and an administration and maintenance software component. A respective plurality of function-related program modules whose processing in the form of what are referred to as "tasks" is coordinated by a multitasking operating system belongs to each of these software components.

Within the call processing software, which can be subdivided into the function complexes of peripheral processing, blind technology and switching technology, the peripheral processing essentially carries out data and information transport functions. The line technology has the job of matching the interface of the peripheral processing of the ISDN interface to the switching technology. The switching technology produces the actual performances for the user surface of the terminal equipment or, respectively, for the interfaces to the various networks.

The dependability software collects occurring error signals from software and hardware complexes and initiates the steps required in order to eliminate errors, to replace malfunctioning function complexes by others, and to display corresponding error messages on a service terminal that can be connected to the switching equipment.

What is meant by administration and maintenance is the administration and maintenance software of the switching equipment that is provided for the purpose of enabling the commissioning and maintaining as well as the control of the entire switching equipment. This also includes the activation and deactivation of system functions as well as the acquisition and archiving of all operational modifications of the overall system.

In a certain sense, the administration and maintenance represents an interface to the function setting of a program-controlled switching equipment. This interface is based on a plurality of individual administration and maintenance instructions that are structured according to switching-oriented points of view and, so to speak, represent the basic structure for influencing the switching equipment. The administration and maintenance related information deposited in a database of the switching equipment, which define the behavior and the functioning of the switching equipment, for example with respect to the connected subscriber terminal equipment, can be directly influenced with a majority of the individual administration and maintenance instructions available.

In the initially cited reference, these individual administration and maintenance instructions are referred to as "AMO" on page 104ff (Administration Maintenance Order). Further information about the structuring and implementation of administration and maintenance oriented components in a program-controlled switching equipment may be derived from European reference EP-0 477 414.

In many instances, particularly given medium and smaller systems, the possibilities for influencing the behavior and the functioning of a switching equipment created by this administration and maintenance interface have provided a degree of variability that, seen from the cost/benefit aspect, allows a loadability of the system software to seem not absolutely necessary. In many switching equipment, the software was therefore deposited in read-only memories that are usually fashioned as a "ROM" and that are contacted on assemblies of the switching equipment.

The advantages of depositing the system software in read-only memories, these lying, for example, in a faster "run-up" of the system or in a lower apparatus-oriented and, thus, financial outlay, are always opposed by a greater outlay in order to undertake modifications of the system software, for example, in order to implement new performance features, protocol operations or new functionalities. All read-only memories, namely, must usually be replaced for this purpose.

SUMMARY OF THE INVENTION

It is an object of the present invention to specify a method for a program-controlled switching equipment having a system program deposited in read-only memories that enables an updating of the system program given read-only memories left unmodified in the switching equipment.

This object is achieved by a method for updating a system program deposited in read-only memories of a program-controlled switching equipment, having an administration and maintenance oriented system program part for the execution of administration and maintenance orders, particularly of access orders onto a random access memory area of the switching equipment that specify address and data. For the input thereof a data processing means in the sense of an administration and maintenance terminal is connected to the switching equipment. The switching equipment also has a read program module for the read-controlled read-in of sequences of information units representing instructions communicated to the switching equipment. The data processing system first communicates instructions for writing an updated system program stored therein into the random access memory area of the switching equipment. Subsequently, an order for writing in a program start address for the updated system program is communicated to the memory location that serves the purpose of storing the return address to be addressed by the processor means of the switching equipment after the end of the read program module.

In the method of the present invention, the administration and maintenance interface is, in a certain sense, misused, that is, function components of the administration and maintenance are used for something for which they are fundamentally not provided. Usually, a memory access order with which a memory address can be specified at whose location information data input in conjunction with the access order are to be stored is also included among the multitude of individual orders made available by the administration and maintenance. This memory access order was only implemented in order to be able to intentionally undertake modifications in the database of the switching equipment.

The method of the present invention utilizes this memory access order, proceeding from a service terminal fashioned as a data-processing means (for example, as a personal computer), to transmit, that is, to copy an updated system program stored in this service terminal into a free memory area of the random access memory of the switching equipment.

The inputting of the updated system program in the random access memory represents a first step of the method of the present invention, whereby the updated system program is not yet assigned as a valid system program to the program-implementing means, for example a microprocessor, merely due to the deposit of the updated system program.

In a second step of the method of the present invention, the program-executing means, referred to below as system processor, is rerouted onto the newly stored, updated system program with the assistance of a memory access order of the administration and maintenance interface.

Before a procedure for this rerouting is set forth in greater detail in the following exemplary embodiment, it seems necessary for a better understanding to first discuss known principles in greater detail in conjunction with a multitasking operating system.

In order to be able to do justice to the specific control jobs, known program-controlled switching equipment are provided with what is referred to as a multitasking operating system that coordinates the plurality of quasi-simultaneously arising, individual jobs that are also to be quasi-simultaneously handled that is typical for a switching equipment. Dependent on events that have arrived or are internally formed, a critical job of this operating system is in assigning corresponding processing rules provided for a reaction to the appertaining events to the system processor for execution, that is, to the system processor that represents the actual program-controlled unit of the switching equipment.

Such events, which, for example, can have the form of 8-bit words, are output, among other things, from the terminal equipment connected to the switching equipment when an operator initiates functions at a terminal equipment (for example, displaying the time of day). Given every initiated function, the terminal equipment outputs an event to the communication system, whereby the functions have different events allocated to them, for example in the form of different binary combinations of the 8-bit word.

Every event is viewed as a requirement in the switching equipment to assign a processing rule individually allocated to the event to the system processor for execution. Event-individual processing rules are therefore available for every possible event, these being deposited as program modules in the system memory. Since, in a certain sense, every program module serves the purpose of realizing a specific job, it is also referred to as "task" when handled by the system processor.

In order to provide the operating system with a decision aid given the presence of a plurality of events that have arrived, that is, regarding which of the events should be handled as the next one and which events still have time for processing, a priority value is unambiguously allocated to each possible event or, respectively, to the program module identified by the event.

A plurality of subsystems are provided in the operating system for governing the coordination and administration jobs made of the operating system. Of these sub-systems one is referred to as allocation subsystem. From the events noted in the process list, this subsystem respectively identifies that event having the highest priority and then assigns the program module identified by this event to the system processor for execution.

A program module currently allocated to the system processor remains allocated to the system processor either until the allocation subsystem has found a higher-priority event in the process list in comparison to the event indicating the momentarily running program module or until the appertaining "task" suspends further execution. The latter is also true when a "task" must wait for the arrival of information.

Fundamentally, every task in an operating system is in exactly one of three operating conditions at an arbitrary point in time, these being referred to as "running", "ready" and "asleep". Consequently, that "task" is running that is being executed at the moment by the system processor, that is, whose program module is assigned to the system processor. All "tasks" are ready that are competing for execution by the system processor, that is, whose program modules are noted as being ready to run in the process list. Those "tasks" that are waiting for the arrival of specific information are a sleep.

In known program-controlled switching equipment, one of these tasks serves the purpose of receiving information communicated to the switching equipment from a service terminal and storing them. These information are composed of binary data words representing a sequence of alpha numerical characters. What is referred to as an interrupt is triggered with the arrival of a data word sent from the service terminal, this interrupt leading to the fact in the operating system that a "read task" is ready to run. As soon as the allocation subsystem has assigned the "read task" to the system processor for execution, the alpha numerical character communicated from the service terminal is read and is forwarded to an administration and maintenance oriented task. After this, this "read task" places itself into a sleeping condition.

The transition from the read task to the allocation subsystem, the phase wherein the read task places itself into the sleeping condition, contains a program-oriented branch from the read task onto a program address within the allocation subsystem; this program address is referred to as return address. As a rule, every task has its individual return address that is deposited in an address memory area in the random access memory. At what memory address the return addresses for the respective tasks are stored is thereby invariably defined by the operating system.

The method of the present invention now provides that the return address for the read task is overwritten by a start address of the updated system program. This again occurs with a memory access order that is directed to the address in the random access memory that contains the return address of the read task.

As a result of the fact that the return address of the read task has been modified into the start address of the updated system program, a program branch into the updated system program deposited in the random access memory ensues when the read task switches into the sleeping condition, this updated system program being treated thereafter as the "valid" system program of the switching equipment.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 3a and 3b is a flowchart for illustrating the method steps that sequence upon implementation of the method of the present invention in the service terminal.

DESCRIPTION OF THE PREFERRED EMBODIMENT

Figure 1:
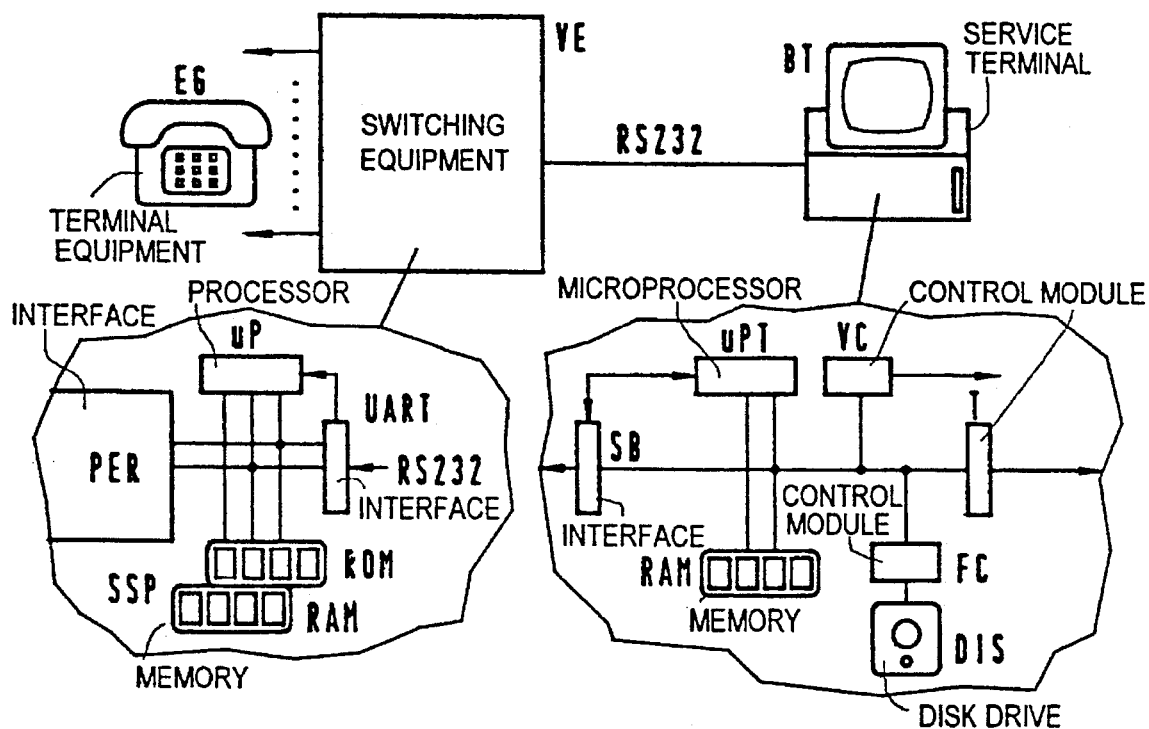
FIG. 1 is a schematic block circuit diagram having control components of a switching equipment and having a service terminal connected thereto.

The components essentially belonging to the control of a program-controlled switching equipment VE, for example of a telephone private branch exchange, are shown in FIG. 1 with reference to a block circuit diagram. A processor means UP, for example a microprocessor of type SAB80XXX, is connected to a system memory SSP via an address bus, a data bus and a control bus. This system memory SSP is composed of semiconductor memory modules of different memory types: of a ROM memory area wherein the entire system program is unmodifiable deposited and of a RAM memory area that serves as read/write main memory. An interface module URT is also connected to the data and control bus, this interface module URT receiving the binary information communicated from a service terminal BT via a serial interface and converting the binary information into a parallel data format of the data bus. Units PER specifically associated to the switching technology are also connected to the data and control bus, these, for example, serving the purpose of matching the terminal equipment EG connected to the switching equipment VE; this, however, shall not be discussed in greater detail below.

For example, a personal computer is provided as service terminal BT. This usually has a microprocessor UPT, a random-access memory RAM, an interface module SB for forming a serial interface, a control module FC for driving a floppy disk drive DIS and control modules VC, T for driving an optical display or, respectively, a keyboard.

The switching equipment VE is connected to the service terminal BT via an interface line RS232 via which the administration and maintenance orders can be transmitted from the service terminal BT to the switching equipment VE. The administration and maintenance orders are usually composed of a sequence of alphabet characters that are followed by a plurality of numerical characters. The characters are successively transmitted via the interface line and, upon every arrival of a character in the switching equipment VE, the interface module UART triggers an interrupt that is forwarded to the processor means UP which then in turn initiates reading out of the received character from the interface module UART. The character that has been read out is then forwarded to the administration and maintenance software component that, after the arrival of all characters specifying the administration and maintenance order, in turn executes the appertaining order.

Figure 2:
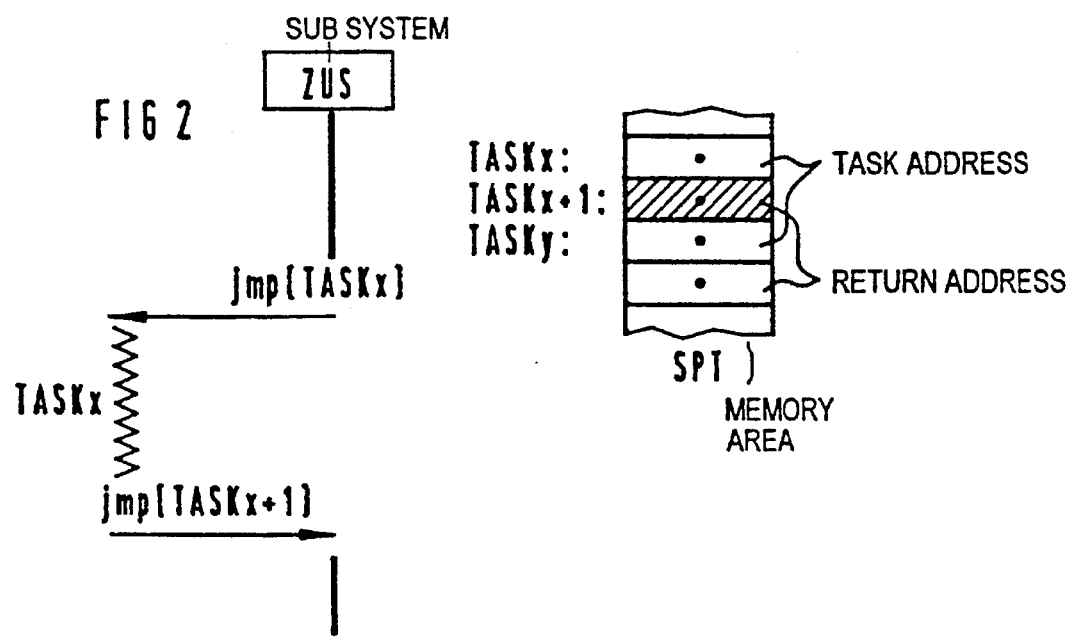
FIG. 2 is a schematic illustration for illustrating the program branches that occur upon activation and deactivation of a task in the operating system of the switching equipment.

How the program-oriented transition from the allocation subsystem ZUS in the operating system of the switching equipment VE is usually undertaken to a task X to be executed next is symbolically shown in FIG. 2. In particular, it is to be shown in a highly simplified way how the task is brought to execution in the operating system and how it is ended.

For example, the task X is the "read task" provided in known switching equipment for reading out the character received in the interface module UART. For the activation of a task, the allocation subsystem ZUS accesses a memory area SPT in which the task address at which the program module for the realization of the appertaining task is located is deposited for every task known to the operating system. Moreover, the return address at which the operating system program is to be continued after the handling of the task, that is, to which program address a return should be made after handling the task so that the allocation subsystem ZUS can be implemented further, is also deposited in the memory area SPT for every task. An indirect program branch onto a task address or, respectively, return address kept in the memory area SPT for the appertaining task is thus respectively executed at the beginning and at the end of a task.

The memory addresses Task x, Task x+1 in the memory area SPT at which the respective task and return addresses belonging to the tasks are stored are defined by the operating system and are not modified by it. The address that is modified by the method of the present invention on the basis of an administration and maintenance order is shown shaded in the FIG. 2.

Figure 3B:
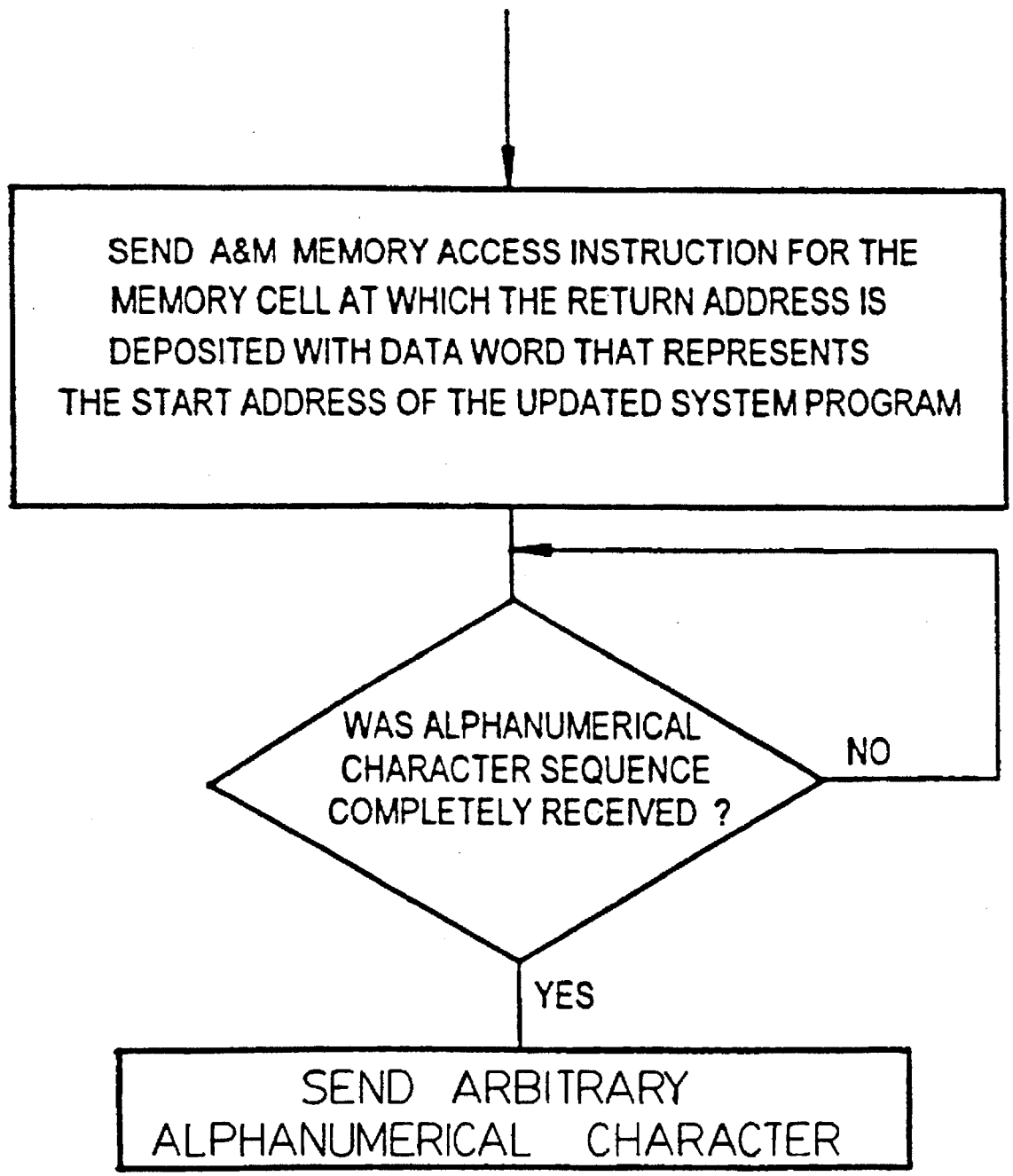

FIGS. 3a and 3b show a flowchart for illustrating the method steps of the present invention that sequence in the operating terminal BT. Before these method steps are initiated, the updated system program has been deposited in the service terminal BT, for example in the form of a floppy disk, and has been at least partially written into the random access memory RAM. After the start of the method, the first address of a memory area of adequate size for storing the updated system program and that is freely available in the RAM area of the switching equipment VE is first identified. This can ensue either on the basis of administration and maintenance orders or the service terminal has been informed of the first free address in some other way. Following thereupon, the first address of the updated system program is identified and the data word located at this address is read out.

An administration and maintenance memory access order having the destination address ZL and having the data word DAT is transmitted via the serial interface to the switching equipment VE. In this transmission, the individual alpha numerical characters that are required for forming the administration and maintenance memory access order as well as for forming the destination address and the data word are successively sent via the interface line. These method steps repeat until the entire, updated system program located in the service terminal BT has been written in the RAM memory of the switching equipment. Two complete system programs that are independent of one another and that are each independent in and of themselves are thus then situated in the switching equipment VE; namely, an old system program deposited in the ROM memory area and the new, updated system program communicated from the service terminal PT.

Subsequently, the service terminal BT communicates an administration and maintenance memory access order to the switching equipment VE that is to write a data word onto the memory address Task x+1 that contains the return address of the read task. The appertaining data word represents the start address of the updated system program deposited in the RAM memory. After the appertaining administration and maintenance memory access order has been completely communicated, that is, the alpha numerical character sequence that is interpreted as a memory access order has been received as a whole, the administration and maintenance software in the switching equipment VE overwrites the return address of the read task with the start address of the updated system program. Given the next alpha numerical character communicated from the service terminal BT, the program return from the read task no longer ensues into the operating system but onto the start address of the updated system program that is then treated as the system program that is valid for the switching equipment VE.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for updating a system program deposited in read-only memories of a program-controlled switching equipment, the switching equipment having an administration and maintenance oriented system program part for execution of administration and maintenance orders, the orders being input by a data processing means connected to the switching equipment, and the switching equipment further having a read program module for read-controlled read-in of sequences of information units representing instructions communicated to the switching equipment, comprising the steps of: communicating from the data processing means instructions for writing an updated system program stored therein into a random access memory area of the switching equipment; and communicating from the data processing means to the switching equipment an order for writing in a program start address for the updated system program to a memory location for storing a return address to be addressed by a processor means of the switching equipment after an end of execution of the read program module.

2. The method according to claim 1, wherein the administration and maintenance orders are access orders onto the random access memory area of the switching equipment that specify address and data.

3. The method according to claim 1, wherein the data processing means is an administration and maintenance terminal that is connected to the switching equipment.

4. A method for updating a system program deposited in a read-only memory of a program-controlled switching equipment, the switching equipment having means for executing access orders onto a random access memory area of the switching equipment that specify address and data, the orders being input by a data processing means in a service terminal that is connected to the switching equipment, and the switching equipment having a read program module for read-controlled read-in of sequences of information units representing instructions communicated to the switching equipment, comprising the steps of: copying an updated system program stored in the service terminal into a free memory area of the random access memory of the switching equipment, the updated system program being unassigned as a valid system program to the data processing means in the service terminal; and running the newly stored, updated system program on a system processor of the switching equipment using an access order from the service terminal.

5. A method for updating a system program deposited in a read-only memory of a program-controlled switching equipment, the switching equipment having means for executing access orders onto a random access memory area of the switching equipment that specify address and data, the orders being input by a data processing means in a service terminal that is connected to the switching equipment, and the switching equipment having a read program module for read-controlled read-in of sequences of information units representing instructions communicated to the switching equipment, comprising the steps of:

storing an updated system program in the service terminal;

identifying a first address of a memory area for storing the updated system program and that is freely available in the random access memory area of the switching equipment and reading out a data word located at the first address;

transmitting an administration and maintenance memory access order having a destination address and having the data word from the service terminal to the switching equipment; and transmitting from the service terminal an administration and maintenance memory access order to the switching equipment for writing the data word onto the memory address that contains a return address of a read task, the data word representing a start address of the updated system program deposited in the random access memory, wherein administration and maintenance software in the switching equipment overwrites the return address of the read task with a start address of the updated system program and wherein when an indicator is next communicated from the service terminal to the switching equipment, the program return from the read task no longer ensues into the operating system, but ensues onto the start address of the updated system program, which is a valid system program for the switching equipment.

* * * * *